Feb. 16, 1932.    F. W. C. NEUNER    1,845,323
HUB CAP
Filed June 23, 1930
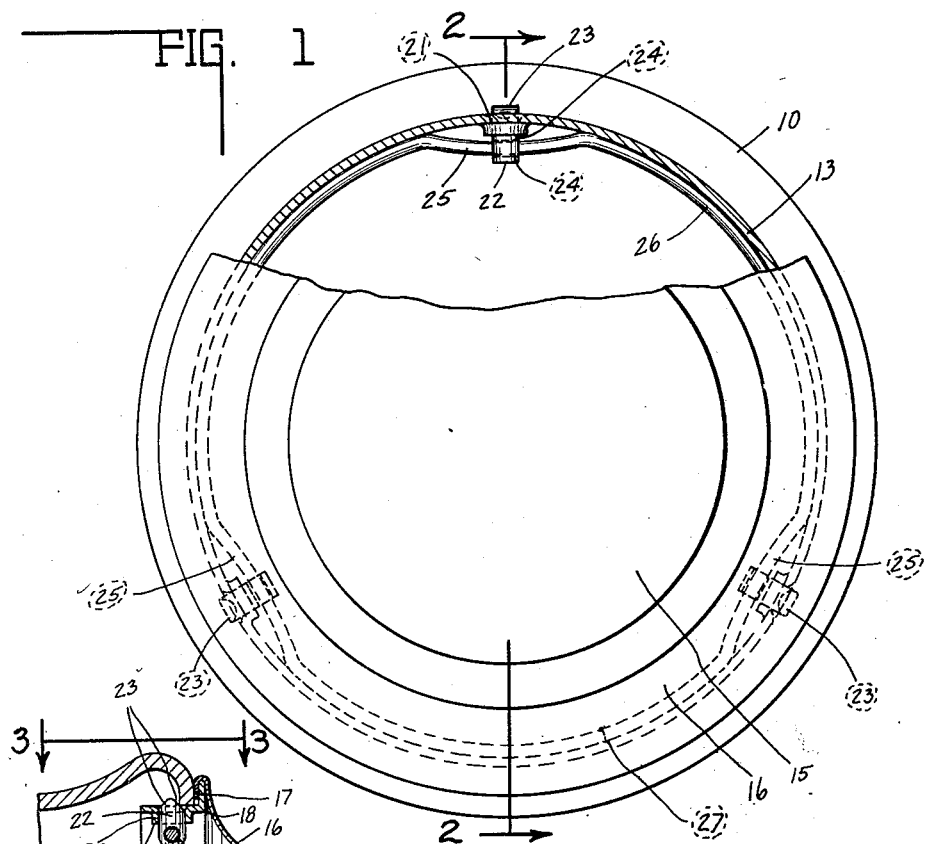
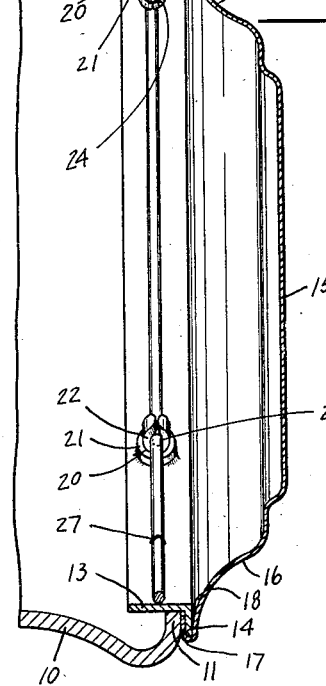
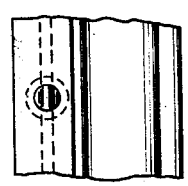
INVENTOR.
FREDERICK W. C. NEUNER.
BY
Lockwood Lockwood Goldsmith & Galt
ATTORNEYS.

Patented Feb. 16, 1932

1,845,323

UNITED STATES PATENT OFFICE

FREDERICK W. C. NEUNER, OF CONNERSVILLE, INDIANA, ASSIGNOR TO INDIANA LAMP CORPORATION, OF CONNERSVILLE, INDIANA, A CORPORATION

HUB CAP

Application filed June 23, 1930. Serial No. 463,041.

This invention relates to a hub cap mounting for vehicle wheels.

The chief object of this invention is to provide a yielding but normally locking connection between a vehicle wheel hub and a hub cap for closing the open end of said hub.

The chief feature of the invention consists in providing a hub cap with means normally arranged for locking association with a hub but which may be forcibly removed from locking position for mounting the hub cap or freeing the same.

A further feature of the invention consists in the particular type of locking mechanism employed and a still further feature of the invention consists in the so-called free floating mounting of the locking members.

The full nature of the invention will be more fully understood from the accompanying drawings and the following descriptions and claims:

In the drawings Fig. 1 is an end view of a hub and cap, a portion of the cap being broken away to show one of the locking members in elevation.

Fig. 2 is a central sectional view taken on line 2—2 of Fig. 1 and in the direction of the arrows.

Fig. 3 is a top plan view of one of the locking elements taken on line 3—3 of Fig. 2.

In the drawings 10 indicates a wheel hub having an inwardly directed flange 11 defining the central opening thereof. Mounted within the central opening is an annular portion 13 which has an outwardly directed flange 14, the same constituting an angle iron construction.

The cover or cap portion includes a central portion 15 which has an outwardly directed portion 16 that is bent back upon itself as at 17 to form an inwardly opening, annular groove 18 which nests the outwardly directed annular flange 14, the same being rigidly connected together.

In the present invention the annular portion 13, in spaced relation, is provided with a plurality of openings 20, each of which herein is illustrated as defined by an inwardly directed collar 21. Slidably mounted in each of the openings 20 is a plunger 22 having oppositely tapered faces 23 so that cam action in opposite directions may be obtained therefrom. Each plunger 22 is apertured as at 24 and extending therethrough is an inwardly arched member 25. Said member is a spring wire having a circular cross section. The main body portion 26 of said spring conforms to and lies immediately adjacent and contacts the tubular portion 13 and frictionally seats against the same. Herein a plurality of plunger constructions are provided and also a plurality of inwardly arched portions 25 are included in a single spring member 26 united by a butt weld as at 27. The plungers are not fully retractable from the openings and consequently the collars prevent the escapement of the plungers carried by the spring and also the spring from the anchorage upon the cap construction.

The cam faces 23 of the several plungers permit the cap to be forcibly applied to the hub opening so the plungers will seat behind the flange 11 and lock the cap to the hub and permit forcible removal of the cap by causing the plungers to engage the flange in the withdrawal movement. Retraction of at least one plunger from locking position will initially free the cap at one portion of the periphery. The remaining portions are thereafter freed in the usual manner.

The invention claimed is:

1. A hub cap mounting including a wheel hub terminating in an open end defined by an inwardly directed flange, a hub cap including a cap closure and an angle iron tubular extension telescopically mounted within the hub with the outwardly directed flange of the angle portion bearing upon the hub flange, the tubular part of said angular portion including a plurality of spaced openings, radially movable locking plungers seatable in said openings and yieldingly mounted to permit forcible mounting of the cap upon and the removal from the hub and normally locking the cap to the hub, each of said plungers having at its inner end a slotted portion, and a spring receivable by all of said slotted portions, said slot receivable portions of said spring being spaced from the tubular portion of the cap and the remaining portion of the spring between said spaced portions being positioned immediately adjacent said tubular portion and conforming thereto.

2. A hub cap mounting including a wheel hub terminating in an open end defined by an inwardly directed flange, a hub cap including a cap closure and an angle iron tubular extension telescopically mounted within the hub with the outwardly directed flange of the angle portion bearing upon the hub flange, the tubular part of said angular portion including a plurality of spaced openings, radially movable locking plungers seatable in said openings and yieldingly mounted to permit forcible mounting of the cap upon and the removal from the hub and normally locking the cap to the hub, each of said plungers having at its inner end a slotted portion, and a spring receivable by all of said slotted portions, said slot receivable portions of said spring being spaced from the tubular portion of the cap and the remaining portion of the spring between said spaced portions being positioned immediately adjacent said tubular portion and conforming thereto, an inwardly directed collar means associated with each flange opening and defining the same, whereby each of the plungers has an elongated axial bearing permitting the free floating of the single common yielding spring anchorage.

In witness whereof, I have hereunto affixed my signature.

FREDERICK W. C. NEUNER.